United States Patent [19]

Toda

[11] Patent Number: 5,295,014
[45] Date of Patent: Mar. 15, 1994

[54] TWO-DIMENSIONAL LASER BEAM SCANNER USING PVDF BIMORPH

[75] Inventor: Minoru Toda, Lawrenceville, N.J.

[73] Assignee: The Whitaker Corporation, Wilmington, Del.

[21] Appl. No.: 975,396

[22] Filed: Nov. 12, 1992

[51] Int. Cl.⁵ .............................................. G02B 26/08
[52] U.S. Cl. ............................... 359/202; 359/224; 235/462; 235/472
[58] Field of Search ........................ 359/201–202, 359/212–214, 223–224; 358/206, 208; 235/462, 472

[56] References Cited

U.S. PATENT DOCUMENTS

| | | | |
|---|---|---|---|
| 3,758,199 | 9/1973 | Thaxter | 350/285 |
| 4,251,798 | 2/1981 | Swartz et al. | 340/146.3 |
| 4,289,379 | 9/1981 | Michelet | 359/666 |
| 4,385,798 | 5/1983 | Yevick | 358/200 |
| 4,387,297 | 6/1983 | Swartz et al. | 235/462 |
| 4,431,912 | 2/1984 | Dickson et al. | 235/466 |
| 4,496,831 | 1/1985 | Swartz et al. | 235/472 |
| 4,500,776 | 2/1985 | Laser | 235/162 |
| 4,775,815 | 10/1988 | Heinz | 310/328 |
| 4,778,233 | 10/1988 | Christenson et al. | 350/6.6 |
| 4,784,448 | 11/1988 | Sepp et al. | 350/6.6 |
| 4,793,699 | 12/1988 | Tokuhara | 350/487 |
| 4,917,484 | 4/1990 | Heinz | 350/487 |
| 5,170,227 | 12/1992 | Bard et al. | 359/202 |

*Primary Examiner*—Bruce Y. Arnold
*Assistant Examiner*—James Phan

[57] ABSTRACT

A two-dimensional laser beam scanning device having a support base and a piezoelectric bimorph structure comprising four consecutively bonded piezoelectric layers disposed in the support base. The two outer layers of the bimorph structure have a shorter length than the two inner layers, and the inner two layers extend lengthwise in one direction past the ends of the outer two layers to form a two-layer bimorph portion having a free end. The four-layer portion is affixed along a first lengthwise edge thereof to the support base. The other lengthwise edge defines a free edge. The free end of the two-layer portion is bent ninety-degrees. The two-layer portion has a different resonant frequency than the four-layer portion. The scanning device further comprises a mirror attached to the free end of the two-layer bimorph portion and electrode means for applying an electrical signal to the bimorph structure to cause the free edge of the four-layer portion and the free end of the two-layer portion to vibrate in orthogonal directions whereby light incident upon the mirror is simultaneously scanned in two orthogonal directions. The applied electrical signal has a first frequency component substantially equal to the resonant frequency of the four-layer portion and a second frequency component substantially equal to the frequency of the two-layer portion. Alternatively, the two dimensional scanning device comprises a piezoelectric bimorph having first and second free end regions disposed in orthogonal planes. First and second mirrors are attached to the first and second free end regions, respectively.

5 Claims, 8 Drawing Sheets

TWO-DIMENSIONAL LASER BEAM SCANNER USING PVDF BIMORPH

BACKGROUND OF THE INVENTION

1. Field of the Invention

This invention relates generally to laser beam scanning devices and more particularly to a device employing one or more piezoelectric bimorphs for scanning a laser beam simultaneously in two orthogonal directions.

2. Description of the Prior Art

Piezoelectric materials are well known in the art and have found wide application in many fields. Ceramic piezoelectric materials such as lead zirconate titanate (PZT) are very rigid and are unsuitable for many applications. Piezoelectric polymers are less dense and more flexible than ceramic piezoelectric materials. One piezoelectric polymer that is an attractive alternative to ceramic piezoelectric materials in many applications is polyvinylidene fluoride (PVDF). PVDF has very different characteristics than its ceramic counterparts. For example, the charge coefficient of PVDF is about one-tenth that of PZT. Additionally, the alternating electric field strength that can be applied to PVDF without depolarization is about fifty times the field strength that can be applied to ceramic piezoelectric materials.

Figure 1A:
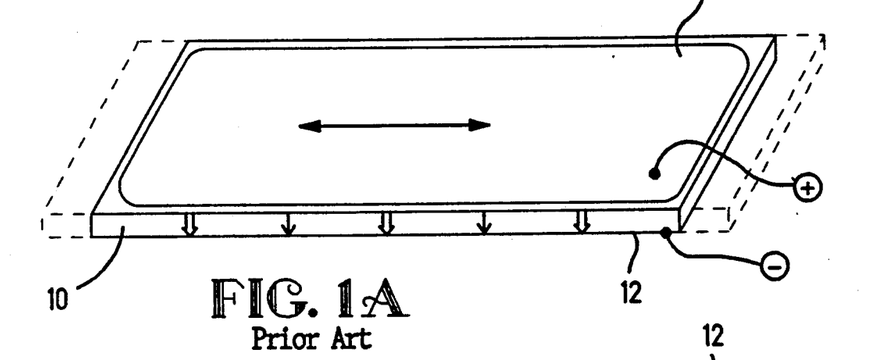
FIG. 1A and 1B are graphical illustrations of the properties of piezoelectric film.
Figure 1B:
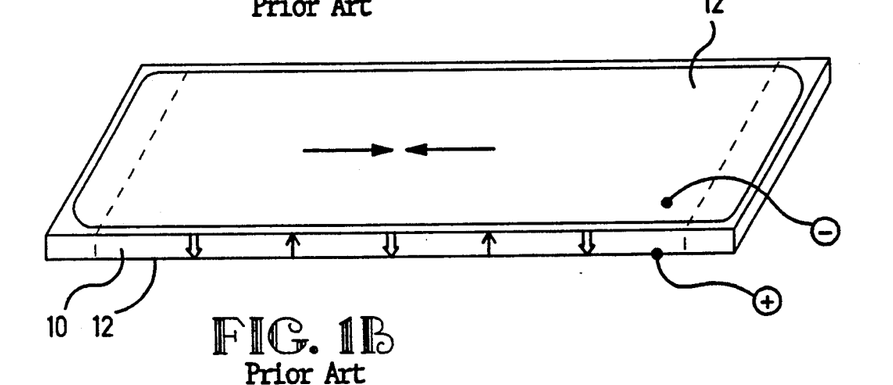

PVDF is typically manufactured as a film having a thickness in the range of 5 to 100 microns. FIGS. 1A and 1B graphically illustrate the well known properties of such films. A typical PVDF film 10 has electrode layers 12 deposited over its upper and lower surfaces for applying a voltage across the thickness of the film 10. During manufacturing, the film is stretched in a given direction as indicated in FIGS. 1A and 1B. A voltage applied across the thickness of the film induces an electric field across the thickness of the film 10. The polarization direction of the film and the direction of the electric film are indicated with the different arrows. As shown in FIG. 1(a), when the electric field has the same direction as the polarization direction of the film, the film will expand in the stretch direction. Conversely, as shown in FIG. 1(b), when the electric field and polarization directions are opposite, the electric field causes the film to shrink in the stretch direction.

Piezoelectric polymer films, and PVDF film in particular, are attractive materials for use in bimorphs. A bimorph is a structure consisting of two strips of piezoelectric film bonded together having their respective polarization directions arranged such that when an electric field is applied across both films, the field direction is the same as the polarization direction of one film, and opposite that of the other film. Consequently, one film will expand while the other shrinks causing the bimorph to bend in one direction. When an oscillating signal is applied across the films, the films alternately expand and contract causing the bimorph to oscillate. PVDF is well suited for bimorph applications due to its flexibility.

Figure 2:
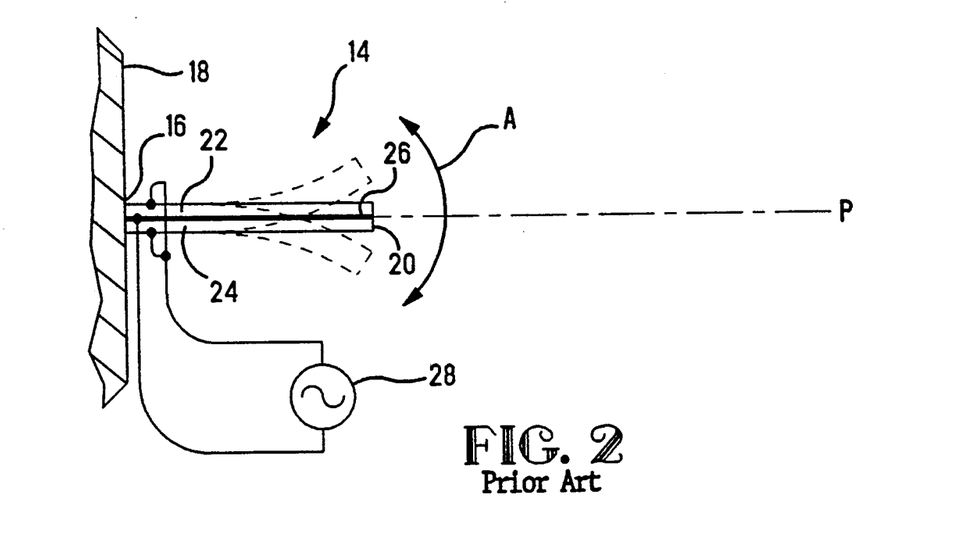
FIG. 2 is a side view of a prior art cantilevered piezoelectric bimorph.

FIG. 2 illustrates the structure and operation of a typical piezoelectric bimorph 14. As shown, the bimorph 14 has a cantilevered end 16 fixedly attached to a support member 18, and a free end 20. The bimorph 14 comprises a first piezoelectric film 22 and a second piezoelectric film 24 bonded together by epoxy or any suitable material such that the respective electrode layers on the bonded sides of each film form a commonly connected electrode layer 26 between the films 22, 24. A voltage source 28 is coupled to electrode layers on the outside surfaces of each film 22, 24 and to the common electrode layer 26 for applying a voltage across the thickness of each film 22, 24. As described above, the films are bonded together with their respective polarization directions arranged such that, in one film, the electric field and polarization directions are the same, but in the other film, the electric field and polarization direction are opposite. An alternating voltage applied across both films will produce alternate expansions and contractions of the upper and lower films 22, 24 thereby causing the free end 26 of the bimorph 14 to vibrate or oscillate in a direction, A, substantially normal to the plane, P, in which the bimorph lies. The frequency of vibration is equal to the frequency of the applied oscillating voltage signal.

Recently, with the advent of optical scanning devices, such as bar code readers which are often found in retail stores, a need has arisen for small, inexpensive laser beam scanning devices capable of scanning a laser beam at relatively high frequencies. Bimorphs, such as that described above, are well suited for laser beam scanning devices. For example, a mirror (not shown) may be attached to the free end 26 of the bimorph 14. A laser beam incident upon the mirror will be scanned in the direction of vibration of the free end 26. Thus, a typical prior art cantilevered bimorph can be used to scan a laser beam in one direction. Bar code readers, however, require devices capable of scanning a laser beam simultaneously in two orthogonal directions because several different bar codes aligned in a parallel direction have to be read out serially. A cantilevered piezoelectric bimorph such as that illustrated in FIG. 2 is inadequate for such purposes.

Several devices exist in the prior art for scanning laser beams. For example, U.S. Pat. No. 3,758,199 issued to Thaxter discloses a laser beam scanning device comprising a pair of piezoelectric film transducers rigidly cantilevered at one end to a support member, but hingedly attached at the other end to the back of a mirror in spaced apart relation to enable pivotal motion of the mirror relative to the transducers. The device of Thaxter is to be distinguished from a bimorph in that the piezoelectric films do not bend, but rather the extension of one film and contraction of the other causes the hinged mirror to rotate about an axis passing through the mirror plane. Although the device of Thaxter is suitable for one-dimensional laser beam scanning, it is not capable of two-dimensional scanning.

U.S. Pat. No. 4,778,233 issued to Christenson et al. discloses a laser beam scanner comprising a pivotally mounted extended member having a reflective surface mounted thereon. A piezoelectric crystal abuts the extended member such that crystal deformation due to an applied voltage will cause the extended member to pivot. As with the device of the Thaxter patent, however, the device of Christenson et al. is not capable of two-dimensional scanning.

U.S. Pat. Nos. 4,775,815 and 4,917,484 issued to Heinz disclose a dynamic mount and actuator for a high energy laser beam steering mirror. The device of Heinz is designed for very precise mirror movements on the order of milliradians to be used in aircraft or space satellites. The complex device comprises three piezoelectric shear motors mounted 120° apart on a cylindrical mounter mount. While two-dimensional laser beam scanning is possible with Heinz's device, it was not designed for applications such as bar code reading, and is much too complex and bulky to be suitable for such applications.

U.S. Pat. No. 4,251,798 issued to Swartz et al describes a two-dimensional laser beam scanning head for use in bar code reading systems employing a rotating polygonally shaped wheel having mirrors on each facet of the wheel to perform x-axis scanning of a laser beam. A single bimorph is used to achieve y-axis scanning. Alternatively, Swartz et al mention that a bimorph could be used for both x- and y-axis scanning, or that a single bimorph element of proper mechanical design electrically driven on both axes could be used; however, Swartz et al nowhere describe how to design such a two bimorph or single bimorph embodiment. Additionally, Swartz et al. do not teach the use of polymer piezoelectric films such as PVDF.

In U.S. Pat. Nos. 4,387,297 and 4,496,831, Swartz et al. disclose a penta-bimorph scanning element (FIG. 15). Swartz et al. mention that one penta-bimorph scanning element can be used for x-axis scanning and another for y-axis scanning. The penta-bimorph element of Swartz comprises a pair of oscillating elements which reciprocally oscillate in response to applied voltages. The bimorphs are each mounted at one end to a support structure, and mirrors are mounted on their upper ends and positioned so as to form a 45° angle. The bimorphs oscillate in the same plane in a manner resembling a tuning fork. Two bimorphs are used in order to increase the scanning angle in a single direction because, individually, the bimorphs used by Swartz et al do not deflect at a large enough angle. Thus, the second mirror deflects the beam in the same direction as the first mirror and merely serves to increase the scan angle. A single penta-bimorph of Swartz et al. cannot provide two-dimensional scanning; rather, as Swartz et al. mention, two pentabimorphs must be used if two-dimensional scanning is to be achieved. Thus, although two-dimensional scanning is possible, two penta-bimorphs must be used thereby increasing the cost, complexity and size of a complete two-dimensional scanning device.

There is a need, therefore, for a laser beam scanning device capable of scanning a laser beam simultaneously in two orthogonal directions which is less complex than the prior art and takes advantage of the properties of piezoelectric films in general, and PVDF in particular. The present invention satisfies these needs.

SUMMARY OF THE INVENTION

Briefly stated, the present invention is directed to a two-dimensional laser beam scanning device. In one embodiment, the device comprises a support base and a piezoelectric bimorph structure comprising four consecutively bonded piezoelectric layers disposed in the support base. Each layer has a length in a longitudinal direction of the support base, a width in a direction perpendicular to the support base, and a thickness in a width direction of the support base. Two outer layers of the bimorph structure have a shorter length than two inner layers and are bonded to the inner two layers such that the bonded inner and outer layers form a four-layer bimorph portion and the inner two layers extend lengthwise in one direction past the ends of the outer two layers to form a two-layer bimorph portion having a free end. The four-layer portion is affixed along a first lengthwise edge thereof to the support base. A second lengthwise edge of the four-layer portion defines a free edge thereof. The free end of the two-layer portion is bent substantially ninety-degrees such that the free end of the two-layer portion extends in the width direction of the support base.

A mirror is attached to the free end of the two-layer bimorph portion for reflecting light incident thereon. Electrode means are connected to the four piezoelectric layers for applying an electrical signal to the bimorph structure to produce vibration of the free edge of the four-layer portion in the width direction of the support base and to produce vibration of the free end of the bent two-layer portion in a direction orthogonal to the direction of vibration of the free edge of the four-layer portion. The orthogonal vibrations of the free edge of the four-layer portion and the free end of the two-layer portion are, consequently, mechanically transmitted to the mirror. Thus, light incident upon the mirror will be simultaneously scanned in two orthogonal directions.

Preferably, the two-layer and four-layer bimorph portions have different resonant frequencies. In such a case, the applied signal preferably has a first frequency component and a second frequency component. The first frequency component is substantially equal to the resonant frequency of one of the bimorph portions and the second frequency component is substantially equal to the resonant frequency of the other of the bimorph portions. Preferably, the resonant frequency of the four-layer bimorph portion is greater than the resonant frequency of the two-layer bimorph portion. The two-layer bimorph portion may further include a hole extending therethrough so as to decrease the resonant frequency of the two-layer portion.

In an alternative embodiment, the two-dimensional laser beam scanning device of the present invention comprises a piezoelectric bimorph having first and second free end regions disposed in orthogonal planes. A first mirror is fixedly attached to the first free end region of the bimorph and is situated in the path of light which consequently is reflected off the first mirror. A second mirror is fixedly attached to the second free end region of the bimorph and positioned in the path of the light reflected off the first mirror. The first and second mirrors are also positioned so as to lie in orthogonal planes. Electrode means are connected to the bimorph for applying an oscillating signal thereto to produce simultaneous vibrations of the first and second free end regions. Each free end region vibrates in a direction normal to the plane in which the free end region lies such that the first and second end regions vibrate in orthogonal directions. Consequently, the orthogonal first and second free end region vibrations of the bimorph are transmitted to the first and second mirrors respectively. Thus, the light incident upon the mirrors is scanned simultaneously in orthogonal directions.

The first end region and second end region each have a resonant frequency. As with the previous embodiment, the applied oscillating signal has a first frequency component and a second frequency component. Preferably, the first frequency component is substantially equal to the resonant frequency of one of the end regions and the second frequency component is substantially equal to the resonant frequency of the other of the end regions. The resonant frequencies of the first and second end regions are preferably different.

In one embodiment, the piezoelectric bimorph comprises a flexible piezoelectric bimorph wherein the first and second free end regions are twisted relative to each other such that they lie in orthogonal planes. According to this embodiment, the device further comprises support means clamped to the flexible bimorph for maintaining the first and second end regions in the orthogonal planes. The first and second end regions extend lengthwise away from the support means and may extend in orthogonal directions, or alternatively, in parallel directions. In either case, however, the mirrors are positioned so that they lie in orthogonal planes.

In another embodiment, the piezoelectric bimorph is an L-shaped piezoelectric bimorph comprising coextensively bonded upper and lower L-shaped piezoelectric layers with orthogonal stretch directions. The L-shaped bimorph has first and second arms extending orthogonal to each other. Each arm has a free end region, and at least one of the free end regions is folded relative to the other free end region such that the free end regions lie in substantially orthogonal planes.

In each embodiment of the two-dimensional laser beam scanning device of the present invention, the piezoelectric material employed is preferably polyvinylidene fluoride (PVDF). Further details of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings, embodiments that are preferred, it being understood, however, that the invention is not limited to the specific methods and instrumentalities disclosed. In the drawings.

DETAILED DESCRIPTION OF THE PREFERRED EMBODIMENTS

Figure 3:
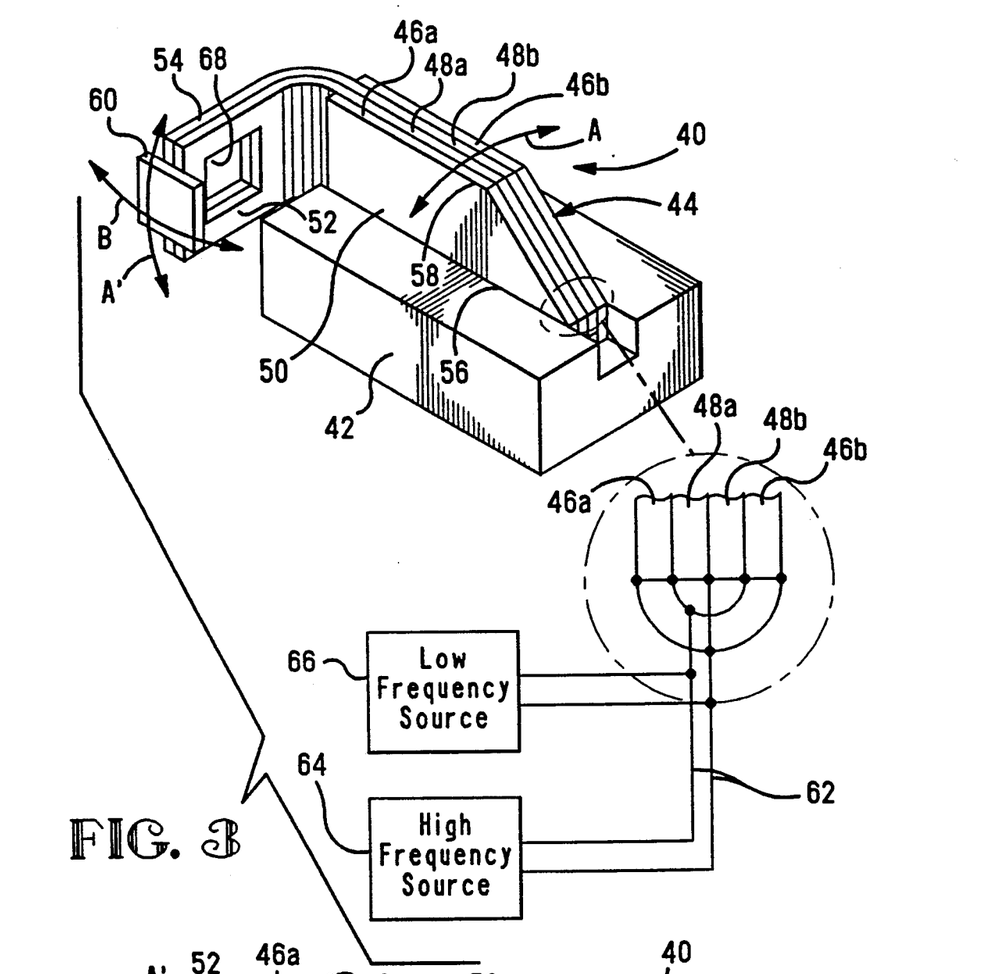
FIG. 3 is a two-dimensional laser beam scanner in accordance with a first embodiment of the present invention.
Figure 4:
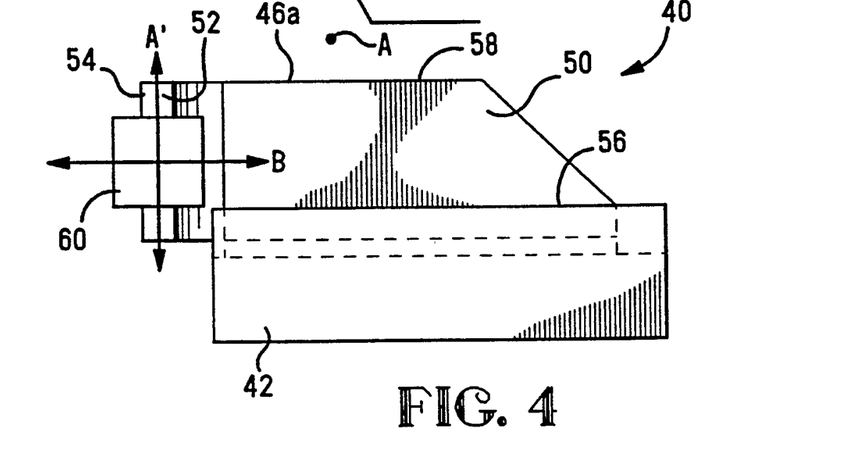
FIG. 4 is a front view of the two-dimensional laser beam scanner of FIG. 3.
Figure 5:
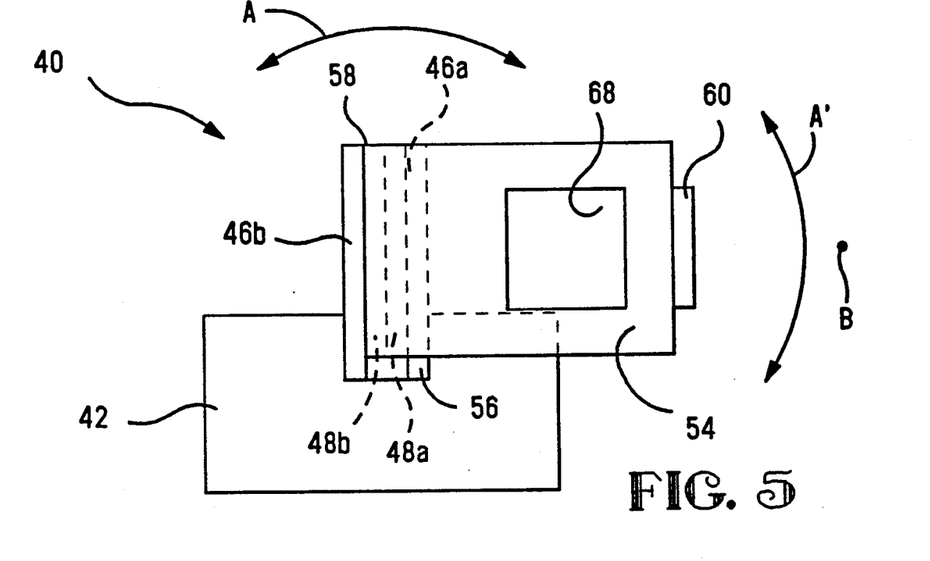
FIG. 5 is a side view of the two-dimensional laser beam scanner of FIG. 3.

In the drawings, wherein like numerals indicate like elements throughout, there is shown in FIGS. 3-5 a first embodiment of a two-dimensional laser beam scanning device 40 in accordance with the present invention. In the first embodiment, the scanning device 40 comprises a support base 42 and a piezoelectric bimorph structure 44 disposed in the support base 42. The bimorph structure 44 comprises four piezoelectric layers 46a, 46b, 48a and 48b. Each layer has a length in the longitudinal direction of the base 42, a width in a direction parallel to the base 42, and a thickness in the width direction of the base 42. In the presently preferred embodiment, each layer is formed of PVDF film. As those skilled in the art will appreciate, however, any piezoelectric polymer may be employed without deviating from the spirit and scope of the present invention. For example, a copolymer of polyvinylidene fluoride-trifluoroethylene (PVDF-TrFE) may be used for each layer 46a, 46b, 48a, 48b.

In the present embodiment, the outer two layers 46a,b have a shorter length than the inner two layers 48a,b and are bonded to the inner two layers 48a,b, as shown, such that the bonded inner and outer layers form a four-layer bimorph portion 50 and the inner two layers 48a,b extend lengthwise in one direction past the ends of the outer two layers 46a,b to form a two-layer bimorph portion 52 having a free end 54. The free end 54 of the two-layer portion 52 is bent, as shown, such that the free end 54 extends in the width direction of the support base 42. A first lengthwise edge 56 of the four-layer portion 50 is fixedly attached to the support base 42. The other lengthwise edge defines a free edge 58 of the four-layer portion 50.

A mirror 60 is attached to the free end 54 of the two-layer portion 52. Electrode means 62 are connected to the four PVDF layers 46a, 46b, 48a, 48b in the manner illustrated in FIG. 3 for receiving a voltage signal from the high and low frequency signal sources 64, 66 respectively. The signal sources 64, 66 are connected in parallel to generate an oscillating voltage signal having a first frequency component and a second frequency component. The voltage signal is applied to the four layers 46a, 46b, 48a, 48b via electrode means 62 resulting in relative signal polarities across the thickness of each layer as shown in FIG. 3.

As those skilled in the art will readily appreciate, an oscillating voltage signal applied to the four layers 46a, 46b, 48a, 48b via electrode means 62 will produce vibration of the free edge 58 of the four-layer portion 50 in a direction A as indicated in FIG. 3. Direction A is substantially perpendicular to the length and width of the four-layer portion 50 and parallel to the width direction of the support base. Because the two-layer portion 52 is bent orthogonal to the four-layer portion 54, vibration of the free edge 58 translates into vibration of the free end 54 in a direction A' as shown. Additionally, the applied oscillating signal at 48a,b will produce vibration of the free end 54 of the two-layer portion 52 in a direction B which is orthogonal to direction A'. Consequently, the mirror 60 simultaneously vibrates in orthogonal directions A' and B. A laser beam (not shown)

incident upon the mirror 60 can therefore be scanned simultaneously in two orthogonal directions.

Each of the bimorph portions 50, 52 has a resonant frequency. According to the present embodiment, the high frequency source 64 generates a high frequency component that is tuned to the resonant frequency of the four-layer portion 50. The low frequency source 66 generates a low frequency component that is tuned to the resonant frequency of the two-layer portion 52. As those skilled in the art understand, a piezoelectric bimorph is more responsive to applied signals at its resonant frequency. Accordingly, the four-layer portion will be most responsive to the high frequency component, and the two-layer portion will be most responsive to the low frequency component of the applied signal. Preferably, the resonant frequency of the four-layer portion 50 is greater than the resonant frequency of the two-layer portion 52, for example, by a factor of 5-to-1. With such a large ratio, the amplitude of the vibrations of each bimorph portion 50, 52 can be independently controlled by adjusting the relative amplitudes of the high and low frequency components of the applied voltage signal. A hole 68 extending through the two-layer bimorph portion 52 operates to decrease the resonant frequency of the two-layer portion so that a greater ratio may more readily be achieved.

FIG. 4 is a front view of the two-dimensional laser beam scanner of FIG. 3 illustrating more accurately the orthogonality of vibration directions A' and B. FIG. 5 is a side view of the two-dimensional laser beam scanner of FIG. 3. As best shown in FIG. 5, the hole 68 extending through the two-layer portion 52 is preferably rectangular in shape; however, any shape hole may be used, such as for example, a circular hole.

The bimorphs employed in the embodiments described hereinafter are formed of two bonded layers of PVDF film. As those skilled in the art will appreciate, however, any piezoelectric polymer may be employed without deviating from the spirit and scope of the present invention. For example, a copolymer of polyvinylidene fluoride-trifluoroethylene (PVDF-TrFE) may be used.

Figure 6:
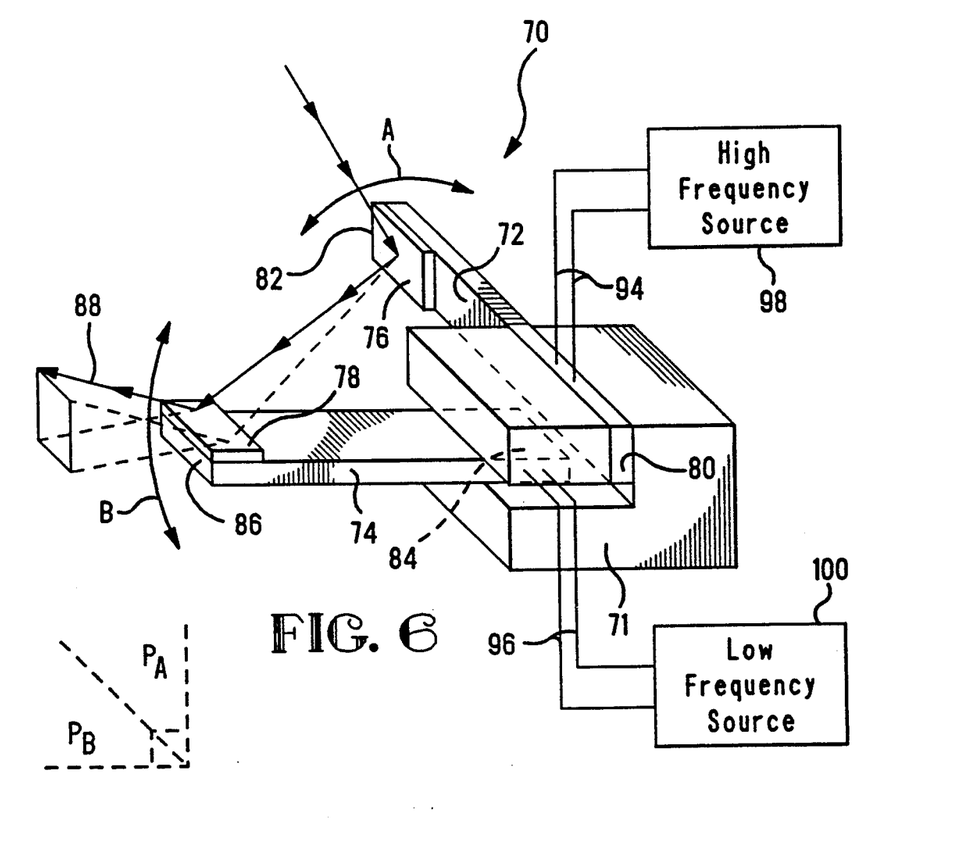
FIG. 6 is a two-dimensional laser beam scanner comprising first and second cantilevered bimorphs in accordance with a second embodiment of the present invention.

FIG. 6 illustrates a second embodiment of the two-dimensional laser beam scanning device 70 of the present invention. According to the second embodiment, the device 70 comprises a support base 71 and first and second piezoelectric bimorphs 72, 74 respectively. The first bimorph 72 has a cantilevered end 80 fixedly attached to the support base 71 and a free end 82 extending lengthwise of the bimorph 72 from the support base 71. Similarly, the second bimorph 74 has a cantilevered end 84 attached to the support base 71 and free end 86 extending lengthwise of the bimorph 74 from the support base 71. A first mirror 76 is coupled to the free end 82 of the first bimorph 72 and is positioned in the path of an incident laser beam 88. A second mirror 78 is coupled to the free end 86 of the second bimorph 74 and is positioned relative to the first mirror 76 in the path of the laser beam reflected from the first mirror 76.

In the present embodiment of FIG. 6, the first bimorph 72 lies substantially in a first plane $P_{A'}$ and the second bimorph 74 lies substantially in a second plane $P_B$ which is orthogonal to plane $P_A$. Additionally, the free end 82 of the first bimorph 72 and the free end 86 of the second bimorph 74 extend in orthogonal directions as shown.

A first oscillating voltage source 98 is coupled to the first bimorph 72 via first electrodes 94. The electrodes 94 are coupled to the bimorph in a conventional manner such as that described previously and illustrated in FIG. 2. The source 98 applies a first oscillating voltage signal to the first bimorph 72 causing the free end 82 to vibrate in a direction A substantially normal to plane $P_{A'}$ as shown in FIG. 6. The bimorph 72 will vibrate at a rate equal to the frequency of the first oscillating signal. Preferably, the frequency of the first oscillating signal is substantially equal to the resonant frequency of the first bimorph 72, since as described previously, a bimorph will achieve maximum vibration amplitude at its resonant frequency.

A second oscillating voltage source 100 is coupled to the second bimorph 74 via second electrodes 96. Again, the electrodes 96 are coupled to the bimorph 74 in a conventional manner such as that described previously and illustrated in FIG. 2. The source 100 applies a second oscillating voltage signal to the second bimorph 74 causing the free end 86 to vibrate in a direction B substantially normal to plane $P_{B'}$ as shown in FIG. 6. Thus, the direction of vibration B of the second bimorph 74 is orthogonal to the direction of vibration A of the first bimorph 72. The second bimorph 74 will vibrate at a rate equal to the frequency of the second oscillating signal. As with the first bimorph 72, the frequency of the second oscillating signal preferably is substantially equal to the resonant frequency of the second bimorph 74.

As mentioned, the first and second bimorphs 72, 74, and therefore the first and second mirrors 76, 78, vibrate in orthogonal directions. Consequently, the laser beam 88 which is incident upon the first mirror and reflected therefrom onto the second mirror will be scanned simultaneously in two orthogonal directions. Each bimorph 72, 74 may have a different resonant frequency and accordingly, the frequencies of the first and second oscillating signals may be different. This allows the laser beam 88 to be scanned at one frequency in direction A and a different frequency in direction B. Alternatively, the resonant frequency of each bimorph 72, 74 may be the same. As those skilled in the art know, many variables affect the resonant frequency of a piezoelectric bimorph, such as the length, width and thickness dimensions of the bimorph as well as its mass. The mass of the attached mirrors may also affect resonant frequency. By adjusting one or more of these variables, the resonant frequency of each bimorph 72, 74 may be controlled.

Figure 7:
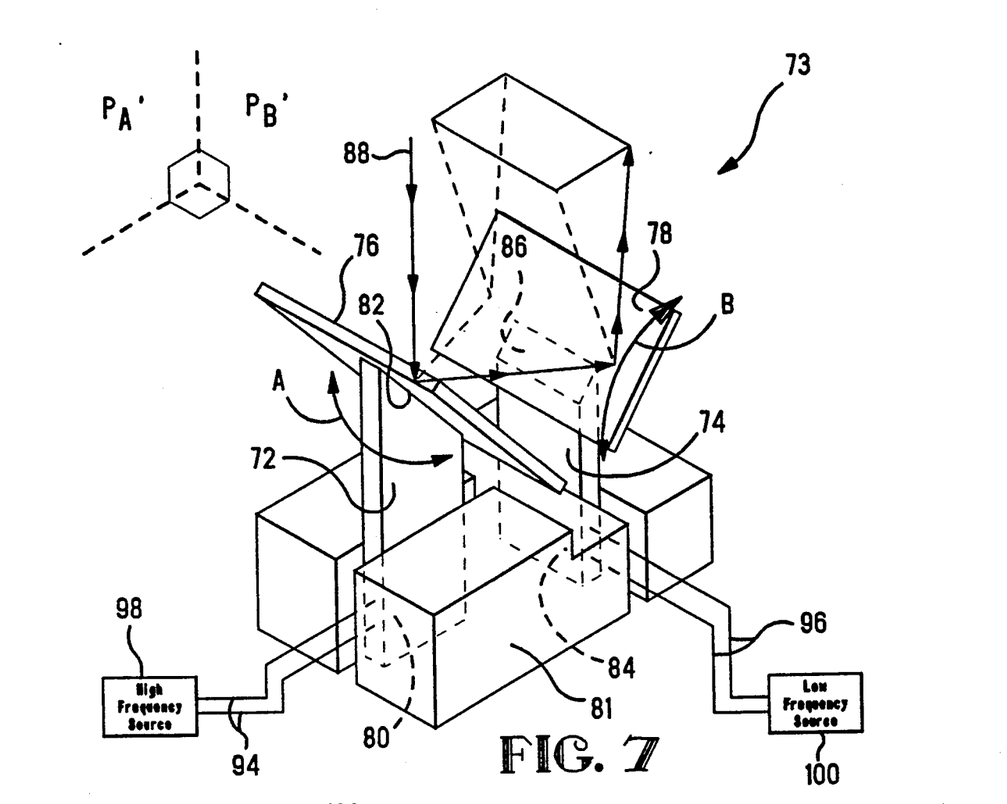
FIG. 7 is a two-dimensional laser beam scanner comprising first and second cantilevered bimorphs in accordance with a third embodiment of the present invention.

FIG. 7 illustrates a third embodiment of the two-dimensional laser beam scanning device 73 of the present invention. As shown in FIG. 7, the third embodiment is identical to the second embodiment (FIG. 6), except that in the third embodiment, the free ends 82, 86 of the first and second bimorphs 72, 74 extend lengthwise from the support base 81 parallel to each other, rather than orthogonally as in the second embodiment (FIG. 6). As shown in FIG. 7, the first and second bimorphs 72, 74 once again lie in orthogonal planes $P_{A'}$ and $P_{B'}$ respectively. Thus, the free end 82 of the first bimorph 72 vibrates in direction A substantially normal to plane $P_{A'}$. Similarly, the free end 86 of the second bimorph 74 vibrates in direction B substantially normal to plane $P_{B'}$. Consequently, as with the second embodiment (FIG. 6), the first and second mirrors 76, 78 vibrate in orthogonal directions. The mirrors 76, 78 are positioned relative to each other such that a laser beam 88 incident upon the first mirror is reflected onto the second mirror. Thus, because of the orthogonal vibrations of the first and second mirrors 76, 78, the laser beam 88 is simultaneously scanned in two-orthogonal directions as illustrated.

Figure 8:
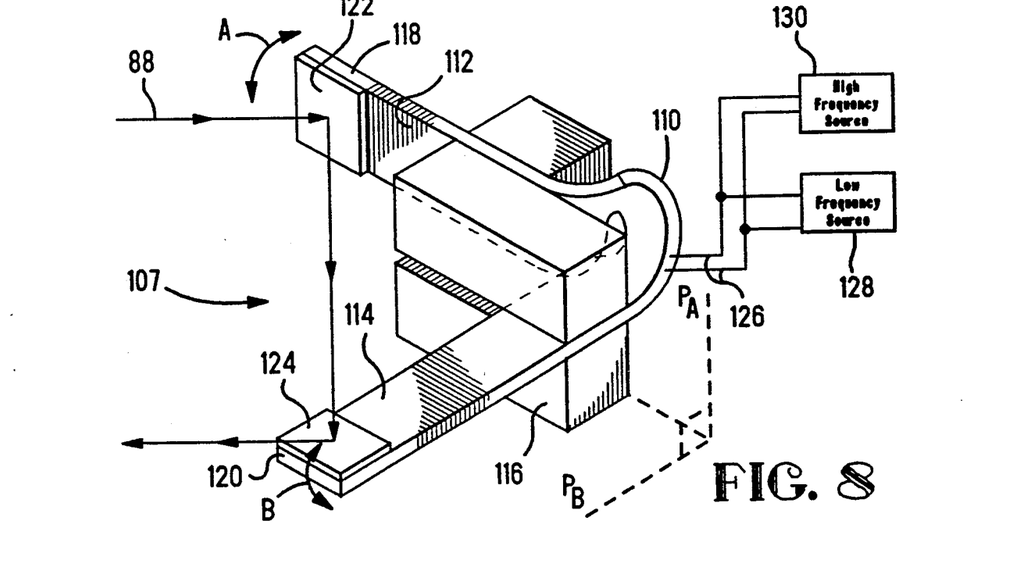
FIG. 8 is a two-dimensional laser beam scanner comprising a single piezoelectric bimorph in accordance with a fourth embodiment of the present invention.

FIG. 8 illustrates a fourth embodiment of the two-dimensional laser beam scanning device 107 of the present invention. According to the fourth embodiment, the device 107 comprises a single flexible piezoelectric bimorph 110 having a first end region 112 and a second end region 114. As illustrated in FIG. 8, the first and second end regions 112, 114 are twisted relative to each other such that the first end region 112 lies in a plane $P_{A'}$ and the second end region 114 lies in a plane $P_B$ that is orthogonal to plane $P_A$. A support means 116 is clamped to the bimorph 110 for maintaining the end regions 112 and 114 in orthogonal planes $P_A$ and $P_B$ respectively. The first end region 112 extends lengthwise from the support means 116 to define a first free end 118 of the twisted bimorph 110. The second end region 114 extends lengthwise from the support means 116 to define a second free end 120. According to the fourth embodiment, the first and second free ends 118, 120 extend from the support means 116 in orthogonal directions.

A first mirror 122 is fixedly attached to the first free end 118 and positioned in the path of an incident laser beam 88. A second mirror 124 is fixedly attached to the second free end 120 and is positioned relative to the first mirror 122 in the path of the laser beam 88 reflected off the first mirror 122. Electrode means 126 are connected to the bimorph 110 for receiving an oscillating signal from the signal sources 128 and 130 and applying the oscillating signal to the bimorph 110. As those skilled in the art will appreciate, an oscillating voltage signal applied to the twisted bimorph 110 will produce simultaneous vibration of the first and second free ends 118, 120 relative to the support means. The first free end 118 will vibrate in a direction A substantially orthogonal to plane $P_{A'}$ and the second free end 120 will vibrate in a direction B substantially orthogonal to plane $P_B$. Thus, the first and second free ends 118, 120 will vibrate in orthogonal directions. Consequently, laser beam 88 will be scanned simultaneously in two orthogonal directions.

As those skilled in the art will appreciate, the distance from the first free end 118 to the support means 116 affects the resonant frequency of the first end region 112. Similarly, the distance from the second free end 120 to the support means 116 affects the resonant frequency of the second end region 114. Therefore, by adjusting the position of the clamped support means 116 relative to the individual free ends 118, 120 of the bimorph 110, the resonant frequency of each end region 112, 114 may be individually adjusted. Also, the mass of each region and the mass of the attached mirror may affect resonant frequency. In the present embodiment, the support means 116 is clamped relative to the free ends 118, 120 such that the resonant frequency of the first end region 112 differs from the resonant frequency of the second end region 114. However, this does not have to be the case. Both end regions 112, 114 may have the same resonant frequency if so desired.

The signal sources 128, 130 are connected in parallel. Signal source 128 provides a low frequency component of the applied oscillating signal, and signal source 130 provides a high frequency component of the applied oscillating signal. According to the present embodiment, the high frequency component is tuned to the resonant frequency of one of the end regions 112, 114 and the low frequency component is tuned to the resonant frequency of the other. This allows the amplitude of vibration of each end region to be independently controlled by varying the relative amplitudes of the high and low frequency components of the applied oscillating signal.

Figure 9:
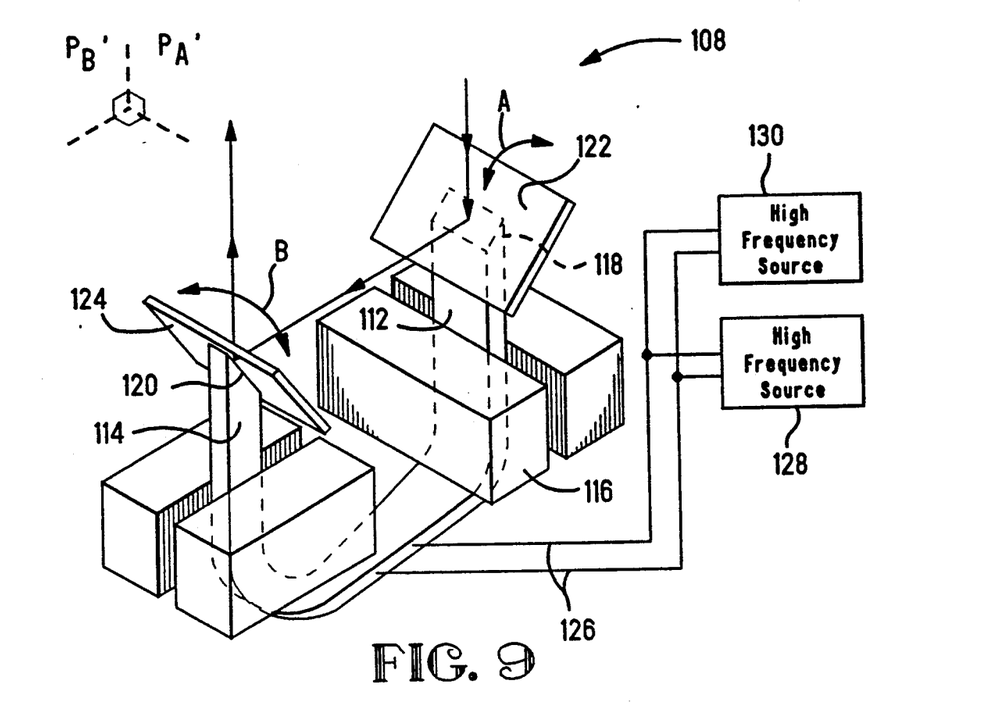
FIG. 9 is a two-dimensional laser beam scanner comprising a single piezoelectric bimorph in accordance with a fifth embodiment of the present invention.

FIG. 9 illustrates a fifth embodiment of the two-dimensional laser beam scanning device 108 of the present invention. As illustrated, the fifth embodiment is identical to the fourth embodiment (FIG. 8) except that the first free end 118 and the second free end 120 extend from the support means 116 in parallel directions. The bimorphs 112, 114 lie in orthogonal planes $P_{A'}$ and $P_{B'}$ respectively. The first and second mirrors 122, 124 are again positioned relative to each other such that the laser beam 88 is reflected off the first mirror 122 and onto the second mirror 124. The simultaneous vibrations of the first and second free ends 118, 120 in orthogonal directions A and B, respectively, again cause the laser beam to be scanned in two orthogonal directions.

Figure 10:
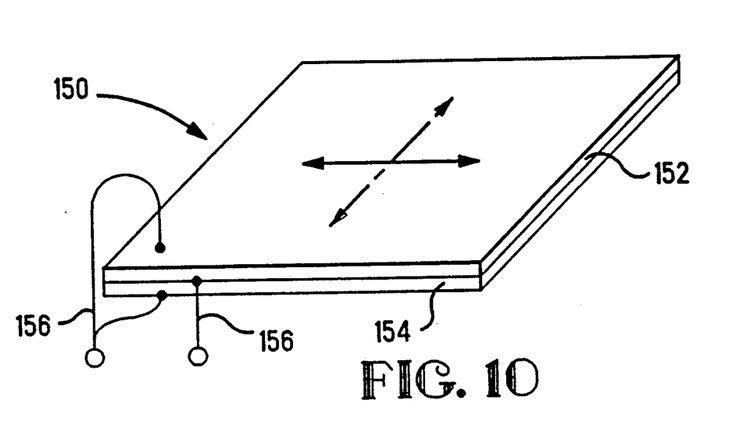
FIG. 10 is a perspective illustration of a two-layer rectangular piezoelectric structure comprising first and second piezoelectric film layers having orthogonal stretched directions.

FIG. 10 illustrates a perspective view of a two-layer rectangular piezoelectric structure 150 comprising an upper piezoelectric film layer 152 bonded to a lower piezoelectric film layer 154. Preferably the upper and lower film layers 152, 154 are formed of polyvinylidene fluoride (PVDF). However, the stretched directions of the upper and lower layers 152, 154 are orthogonally oriented in the bonded structure 150 as illustrated in FIG. 10. Each piezoelectric layer 152, 154 has an electrode material (not shown) deposited over its outer surface, and a common electrode layer (not shown) lies between the bonded layers 152, 154. Electrodes 156 are connected to the layers 152, 154 as shown.

Figure 11A:
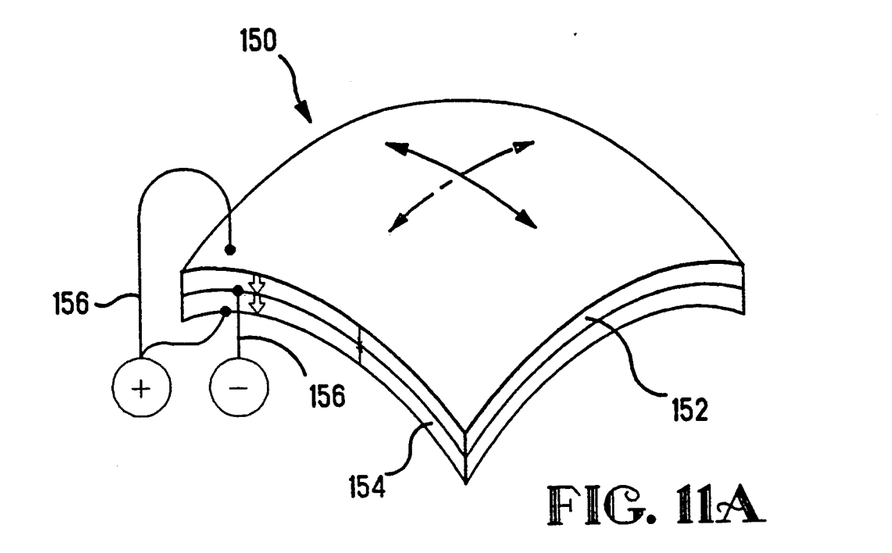
FIGS. 11(a) and 11(b) graphically illustrate the properties of the two-layer structure of FIG. 10.
Figure 11B:
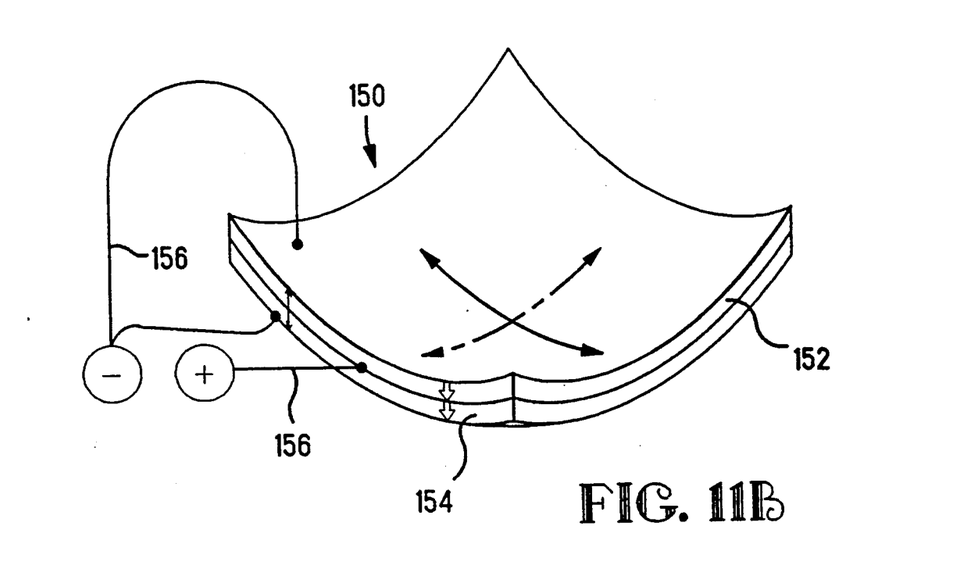

FIG. 11 graphically illustrates how the rectangular structure 150 of FIG. 10 responds to a voltage signal applied across electrodes 156. As indicated by the arrows, the relationship between the electric field and polarization directions in the respective films 152, 154 is such that one film will expand while the other shrinks in response to a voltage applied across electrodes 156. However, because the stretch directions of the upper and lower layers 152, 154 are orthogonal (rather than parallel as in a conventional bimorph), the rectangular structure 150 deforms to a spherical surface under the applied voltage. The direction of spherical deformation depends upon the polarity of the applied voltage signal as illustrated in FIG. 11.

Figure 12:
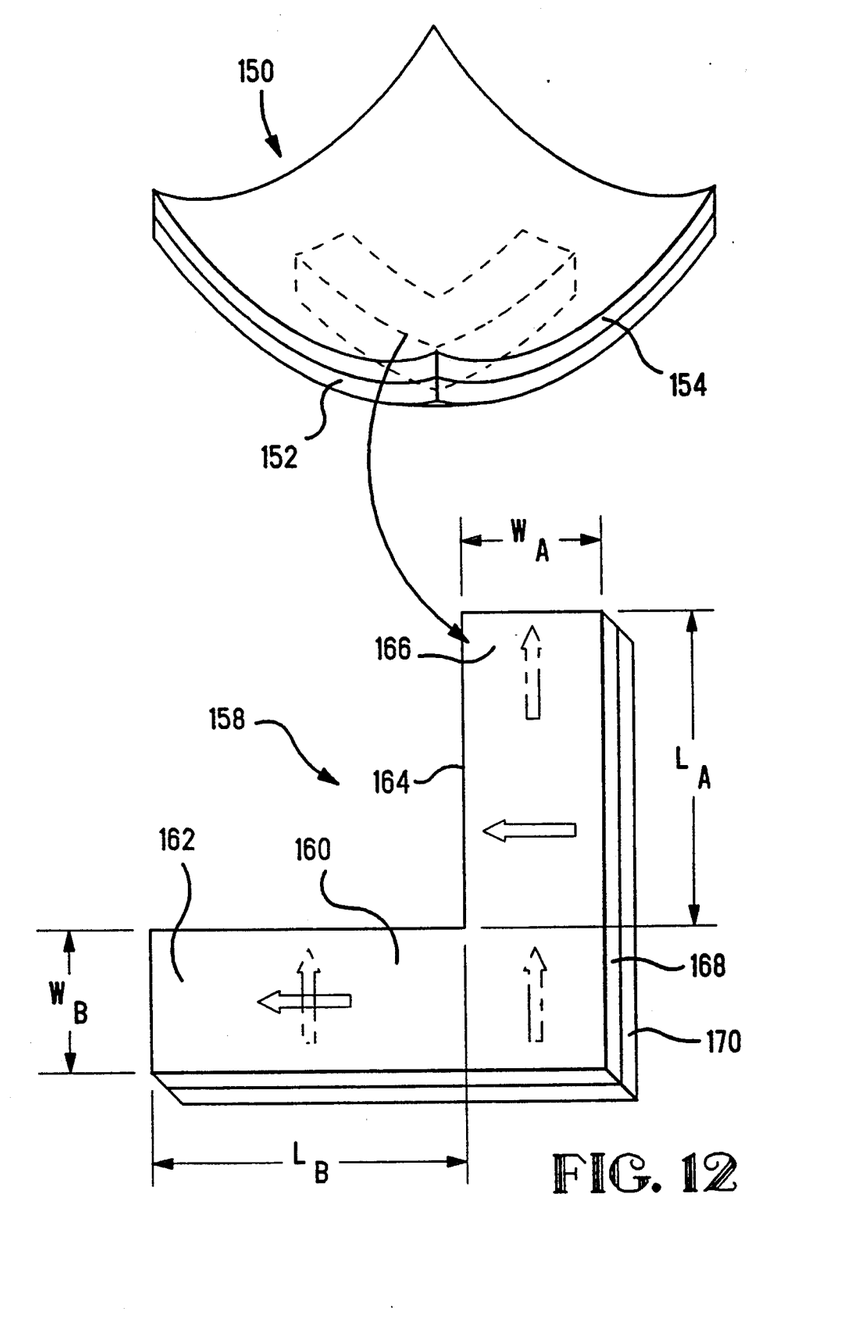
FIG. 12 is a graphical illustration of the fabrication of an L-shaped biaxial bimorph from the two-layer structure of FIG. 10.

FIG. 12 illustrates the fabrication of an L-shaped biaxial bimorph 158. As illustrated by the dashed lines, the biaxial bimorph 158 is cut out of the rectangular two-layer structure 150. The L-shaped bimorph 158 has a first arm 160 with a first end region 162, and a second arm 164 with a second end region 166. As shown in FIG. 12, the L-shaped bimorph 158 is cut out from the rectangular structure 150 such that the stretched direction of the upper layer 168 is parallel to the lengthwise extension of the second arm 164, and the stretched direction of the lower layer 170 is parallel to the lengthwise extension of the first arm 160 of the biaxial bimorph 158. As shown, the first arm 160 has a length $L_A$ and a width $W_A$. Similarly, the second arm 164 has a length $L_B$ and a width $W_B$.

Figure 13:
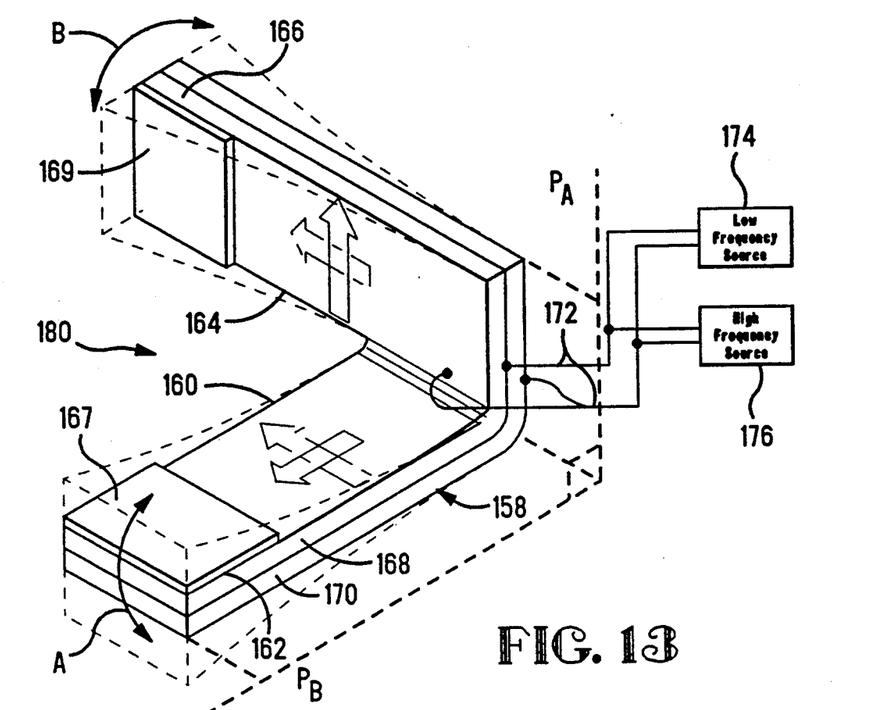
FIG. 13 is a two dimensional laser beam scanner comprising an L-shaped biaxial bimorph in accordance with a sixth embodiment of the present invention.

FIG. 13 illustrates a sixth embodiment of the two dimensional laser beam scanner 180 of the present invention employing an L-shaped biaxial bimorph, such as bimorph 158 of FIG. 12, in place of the cantilevered (FIGS. 6 and 7) and twisted (FIGS. 8 and 9) bimorphs illustrated above. As shown, the first arm 160 of the biaxial bimorph 158 is bent or folded relative to the second arm 164 such that the free end regions 162, 166 of each arm lie in orthogonal planes $P_A$ and $P_B$ respectively. A first mirror 167 is attached to the free end region 162 of the first arm 160, and a second mirror 169 is attached to the free end region 166 of the second arm 164. Electrodes 172 are connected to the biaxial bimorph 158 as shown for receiving an applied oscillating signal from signal sources 174 and 176. The signal sources 174 and 176 are connected in parallel. The electrodes 172 are connected to the bimorph 158 in a manner similar to the connections illustrated in FIG. 11. Thus, the electrode layers (not shown) on the outer surfaces of the upper and lower layers 168, 170 of the bimorph 158 are coupled to one terminal of each signal source 174, 176 and the common electrode layer (not shown) between the upper and lower layers 168, 170 of the bimorph 158 is coupled to the other terminal on each signal source.

An oscillating voltage signal applied to the biaxial bimorph 158 will produce simultaneous vibration of the first and second free end regions 162, 166. Because of the orthogonal orientation of the stretch directions of the upper and lower layers 168, 170, the first free end region 162 will vibrate in a direction A substantially orthogonal to plane $P_A$ in which the first end region 162 lies, while the second free end region 166 will vibrate in a direction B substantially orthogonal to plane $P_B$. Thus, the first and second free end regions 162, 166 will vibrate in orthogonal directions. The orthogonality of the stretch directions (which are also parallel to the lengthwise extension of the respective arms 160, 164) of the upper and lower layers 168, 170 prevents the free end regions 162, 164 from vibrating in any other directions. However, the respective lengths $L_A$ and $L_B$ of the first and second arms 160, 164 must be greater than the respective widths $W_A$ and $W_B$ in order for the free end regions 162, 166 to vibrate effectively. As with the previous embodiments, a laser beam (not shown) incident upon the first mirror 167 and reflected onto the second mirror 169 will be scanned simultaneously in two orthogonal directions.

As those skilled in the art will appreciate, the length $L_A$ and width $W_A$ of the first arm 160 affect the resonant frequency of the first arm 160. The mass of the arm and mass of the first mirror 167 will also have some affect. Similarly, the length $L_B$ and width $W_B$ of the second arm 164 and the mass of the mirror affect the resonant frequency of the second arm 164. Therefore, by altering the length and width dimensions of each arm 160, 164 and/or the mass of the mirrors, the resonant frequency of each arm 160, 164 may be individually determined. In the present embodiment, the resonant frequency of the first arm 160 differs from the resonant frequency of the second arm 164. However, this does not have to be the case; both arms 160, 164 may have the same resonant frequency if so desired.

As mentioned, the signal sources 174, 176 are connected in parallel. Signal source 174 provides a low frequency component of the applied oscillating signal, and signal source 176 provides a high frequency component of the applied oscillating signal. According to the present embodiment, the high frequency component is tuned to the resonant frequency of one of the arms 160, 164 and the low frequency component is tuned to the resonant frequency of the other. The free end regions 162, 166 achieve maximum response to the applied oscillating signal when driven at their respective resonant frequencies. Thus, so long as the resonant frequencies of the respective arms 160, 164 differ sufficiently (e.g. by a ratio of 5-to-1), the amplitude of vibration of the respective free end regions 162, 166 may be independently controlled by varying the relative amplitudes of the high and low frequency components of the applied oscillating signal.

Figure 14:
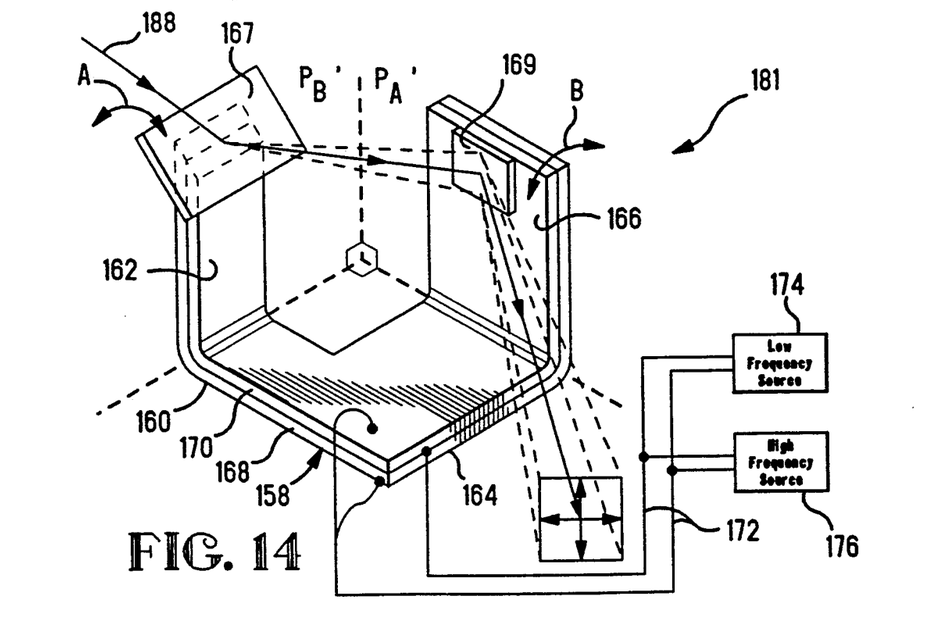
FIG. 14 is a two-dimensional laser beam scanner comprising an L-shaped biaxial bimorph in accordance with a seventh embodiment of the present invention.

FIG. 14 illustrates a seventh embodiment of the two-dimensional laser beam scanning device 181 of the present invention. As illustrated, the seventh embodiment comprises the same biaxial bimorph 158 as the sixth embodiment (FIG. 13); however, in the seventh embodiment, both the first end region 162 of the first arm 160 and the second free end region 166 of the second arm 164 are bent to establish the free end regions 162 and 166 in orthogonal planes $P_{A'}$ and $P_{B'}$ respectively. The first and second mirrors 167, 169 are once again positioned relative to each other such that a laser beam 188 is reflected off the first mirror 167 and onto the second mirror 169. As those skilled in the art will appreciate, the operation of the scanning device 181 of FIG. 14 (i.e., the seventh embodiment) is substantially identical to the operation of the device 180 of FIG. 13 (i.e., the sixth embodiment). Once again, the first and second end regions 162, 166 simultaneously vibrate in orthogonal directions A and B respectively. Consequently, the laser beam (not shown) will be scanned in two orthogonal directions.

As the foregoing detailed description illustrates, the present invention comprises a two-dimensional laser beam scanning device employing PVDF bimorphs. It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

What is claimed is:

1. A two-dimensional laser beam scanning device comprising:

a support base;

a piezoelectric bimorph structure comprising four consecutively bonded piezoelectric layers disposed in said support base, each layer having a length in a longitudinal direction of said support base, a width in a direction perpendicular to said support base, and a thickness in a width direction of said support base, two outer layers of said bimorph structure having a shorter length than two inner layers and being bonded to the inner two layers such that the bonded inner and outer layers form a four-layer bimorph portion and the inner two layers extend lengthwise in one direction past the ends of the outer two layers to form a two-layer bimorph portion having a free end, the four-layer portion being affixed along a first lengthwise edge thereof to the support base, a second lengthwise edge of the four-layer portion defining a free edge thereof, and the free end of the two-layer portion being bent substantially ninety-degrees such that the free end of the two-layer portion extends in the width direction of said support base;

a mirror attached to the free end of the two-layer bimorph portion for reflecting light incident thereon; and electrode means connected to the four piezoelectric layers for applying an electrical signal to said bimorph structure to produce vibration of the free edge of the four-layer portion in said width direction of said support base and to produce vibration of the free end of the bent two-layer portion in a direction orthogonal to the direction of vibration of the free edge of said four-layer portion, the orthogonal vibrations of the free edge of the four-layer portion and the free end of the two-layer portion being mechanically transmitted to the mirror, whereby light incident upon the mirror is simultaneously scanned in two orthogonal directions.

2. The laser beam scanning device of claim 1 wherein the two-layer and four-layer bimorph portions have different resonant frequencies, and wherein the applied signal has a first frequency component and a second frequency component, the first frequency component being substantially equal to the resonant frequency of one of said bimorph portions and the second frequency component being substantially equal to the resonant frequency of the other of said bimorph portions.

3. The laser beam scanning device of claim 2 wherein the resonant frequency of the four-layer bimorph portion is greater than the resonant frequency of the two-layer bimorph portion.

4. The laser beam scanning device of claim 2 wherein the two-layer bimorph portion has a hole extending therethrough so as to decrease the resonant frequency of the two-layer portion.

5. The laser beam scanning device of claim 1 wherein the piezoelectric material employed is polyvinylidene fluoride (PVDF).

* * * * *